US006039237A

United States Patent [19]

Nakajima et al.

[11] Patent Number: 6,039,237

[45] Date of Patent: Mar. 21, 2000

[54] HEATING TIP AND METHOD OF MANUFACTURING THE SAME

[75] Inventors: Masahiko Nakajima; Naoyuki Yamasawa; Masaru Nakamura, all of Saitama, Japan

[73] Assignee: Nakajima Cooper Works, Inc, Japan

[21] Appl. No.: 09/164,581

[22] Filed: Oct. 1, 1998

[30] Foreign Application Priority Data

Oct. 1, 1997 [JP] Japan .................................... 9-283188

[51] Int. Cl.[7] ........................................................ B23K 3/00

[52] U.S. Cl. ................................ 228/51; 228/54; 228/55; 279/103

[58] Field of Search ................................ 228/51, 54, 55; 279/103

[56] References Cited

U.S. PATENT DOCUMENTS

| | | | |
|---|---|---|---|
| 3,770,937 | 11/1973 | Smits | 219/241 |
| 4,500,027 | 2/1985 | Nakajima . | |
| 4,560,101 | 12/1985 | Wilhelmson et al. | 228/54 |

*Primary Examiner*—Patrick Ryan
*Assistant Examiner*—M. Alexandra Elve
*Attorney, Agent, or Firm*—Liniak, Berenato, Longacre & White, LLC

[57] ABSTRACT

A heating tip in which an insertion cavity is formed in a tip substrate made of copper or copper alloy for insertion and containment of a heat generating portion, wherein the inner circumferential wall surface of the insertion cavity is formed by forging into a non-circular cross sectional shape which is identical with a non-circular cross sectional shape on the outer circumferential surface of the heat generating portion. The insertion cavity has the non-circular cross sectional shape and, accordingly, the area of contact with the heat generating portion is enlarged compared with a case of a circular cross sectional shape with the hole volume being assumed identical, thereby increasing the heat conductivity from the heat generating portion and enhancing the temperature rising characteristics and the thermal response of the heating tip. Since the insertion cavity is formed by forging loss of the material can be decreased, neatly and easily and, in addition, working life of the tool can be extended.

2 Claims, 8 Drawing Sheets

1
3
4
2
6
5

HEATING TIP AND METHOD OF MANUFACTURING THE SAME

BACKGROUND OF THE INVENTION

1. Field of the Invention

The present invention concerns a heating tip used as a soldering tip, a hot knife or a hot blow tip in which a heat generating portion such as an electric heater or a gas combustion catalyst part is inserted and contained in an insertion cavity and a method of manufacturing such a heating tip and, more in particular, it relates to a heating tip capable of improving the heat conduction efficiency and the temperature rising characteristic of a tip, as well as a method of manufacturing such a heating tip.

2. Statement of Related Art

In a case of manufacturing a heating tip such as a tip of an electric soldering iron, a tip substrate is formed by applying iron plating on a surface of a cylindrical copper substrate. Then, the tip substrate is shaped by forging and then an insertion cavity is formed by cutting in the base end of the tip substrate for containment of a heat generating portion by using a cutting tool, for example, a drill or a bit as disclosed in U.S. Pat. No. 4,500,027 (Japanese Patent Publication Sho 59-11386).

In the method of manufacturing the heating tip as described above, the insertion cavity for the heat generating portion is usually formed by drilling or like other cutting. In the cutting operation, however, since a great amount of cutting chips are discharged wastefully, they result in a problem of increasing the material cost and also increasing a burden for disposal of wastes. This is particularly remarkable when the depth of the insertion cavity is large relative to the entire length of the heating tip.

Further, when the insertion cavity is formed by using a drill, since long twisted chips are formed continuously, they require considerable period of time to treat them. This drawback may be avoided by fabricating the insertion cavity while reciprocating the drill but this increases the operation time and lowers the productivity.

Further, when the insertion cavity is formed by cutting after the iron plating, plated iron is mixed in the chips of copper, to make the recycling operation of the copper chips difficult. If copper and iron can not be separated completely, it results in a problem that the commercial value of the copper chips in reuse is remarkably reduced. This problem may be solved by mechanically cutting off to remove the rear end portion of the heating tip before forming the insertion cavity. However, since the cut off pieces falls on the same place as that for the copper chips, they can not be separated easily.

Further, before cutting fabrication, centering has to be conducted accurately from the outside of the iron plating layer. However, since the thickness of the plating layer is not always uniform, centering for the insertion cavity may often be displaced to bring about a problem that the heating tip can not be heated uniformly by the heat generating portion.

Further, since it is almost impossible to mirror finish the inner circumferential surface of the insertion cavity by cutting fabrication, oxide scales are formed during use to worsen the heat efficiency.

In view of the above, electroless plating is sometimes adopted to the inner wall surface of the insertion cavity. However, if chips formed in the preceding cutting step remain in the insertion cavity, they are dissolved in the plating solution and break the balance of the composition of the plating solution, failing to obtain a satisfactory plating layer.

Even if a satisfactory plating layer can be obtained, there is still present a problem that the plated layer is defoliated in an extremely short period of time since the surface of the insertion cavity is not smooth.

Then, a stainless steel pipe is sometimes inserted instead of applying plating in the insertion cavity. However, since the heat conductivity is extremely poor in the case of using stainless steel, this leads to a problem that the heat efficiency of the tip is worsened extremely.

Further, even if a super-hard drill or the like is used, in a case of the cutting operation, the drill is abraded rapidly and results in a problem that the bore diameter of the insertion cavities varies greatly.

Finally but most importantly, the cross sectional shape of the insertion cavity can not be formed in any other shape than the circular shape by drill-cutting, so that the heat generating portion also has to be formed to a circular cross sectional shape. However, for a certain identical volume, a circular circumferential shape gives the smallest surface area among other shapes, and this results in a problem of deteriorating the heat conductivity between the outer circumference of the heat generating portion and the inner wall circumference of the tip cavity.

OBJECT OF THE INVENTION

In view of the foregoing situations, an object of the present invention is to provide a heating tip capable of increasing the heat conduction capacity so as to cope with high speed soldering operation even when the size of the tip is small and also capable of enhancing the temperature rising characteristic of a tip upon starting soldering operation.

Another object of the present invention is to provide a heating tip capable of improving the heat conduction efficiency.

A further object of the present invention is to provide a method of manufacturing a heating tip capable of forming an insertion cavity easily and at a high accuracy, mirror finishing the inner surface of the insertion cavity, and eliminating loss of material.

A further object of the present invention is to provide a method of manufacturing a heating tip capable of making the tip more dense and capable of accurately centering the insertion cavity thereby enabling to heat the tip uniformly.

A further object of the present invention is to provide a method of manufacturing a heating tip capable of accurately centering the insertion cavity and improving the corrosion resistance of the tip.

A further object of the present invention is to provide a method of manufacturing a heating tip capable of preventing injury of an insertion cavity caused by a plating solution.

A further object of the present invention is to provide a method of manufacturing a heating tip with no worry of breaking the balance in the composition of a plating solution by intrusion of impurities.

A further object of the present invention is to provide a method of manufacturing a heating tip capable of reliably and easily closing the base end of the insertion cavity.

A further object of the present invention is to provide a method of manufacturing a heating tip capable of obtaining a stable plating layer at the inner wall circumferential surface of the insertion cavity.

A further object of the present invention is to provide a method of manufacturing a heating tip capable of reliably closing an entrance of the insertion cavity irrespective of the shape and the size of the tip substrate.

A further object of the present invention is to provide a method of manufacturing a heating tip capable of facilitating the fabrication and improving the operability.

A further object of the present invention is to provide a method of manufacturing a heating tip capable of obtaining a heating tip identical with that having an insertion formed by cutting after applying corrosion resistant plating.

A further object of the present invention is to provide a method of manufacturing a heating tip capable of easily obtaining a heating tip in which an insertion cavity is formed by forging.

A further object of the present invention is to provide a method of manufacturing a heating tip capable of easily obtaining a heating tip having excellent solder wettability only at a top end portion.

A further object of the present invention is to provide a method of manufacturing a heating tip capable of easily obtaining a heating tip easy to fabricate and having a required length.

A further object of the present invention is to provide a method of manufacturing a heating tip capable of coping with high speed soldering or the like even if the size of the tip is small and capable of improving the temperature rising characteristics of the tip.

SUMMARY OF THE INVENTION

The foregoing objects of the present invention can be attained by a heating tip, in which an insertion cavity is formed in a cylindrical tip substrate made of copper or copper alloy for insertion and containment of a heat generating portion, wherein the inner wall circumferential surface of the insertion cavity is formed into a non-circular cross sectional shape which is identical with a non-circular cross sectional shape on the outer circumferential surface of the heat generating portion.

The non-circular cross sectional shape of the insertion cavity is preferably a polygonal shape within a range from a normal trigonal shape to a normal octagonal shape.

Since the insertion cavity has a non-circular cross sectional shape which is identical with that of the outer circumferential surface of the heat generating portion, the surface area of contact between the inner circumferential wall surface of the insertion cavity and the outer circumferential surface of the heat generating portion can be increased compared with a usual heating tip having a circular cross sectional shape even if the volume of them is identical. Therefore, it is possible to improve the heat conductivity and enhance the temperature rising characteristics and the thermal response of the heating tip.

Further, if the heat generating portion comprises an electric heat generating body (heater), the surface load density given by dividing the amount of heat generation with the surface area thereof can be lowered to reduce injury to the heat generating portion and extend the working life.

Further, with respect to an identical surface load density, the amount of heat generation can be increased to increase the heat capacity, and high speed soldering can be conducted by a small sized tip.

Further, positional alignment between the tip and the heat generating portion around an axis is possible to facilitate operation upon assembling operation.

The present invention also provides a method of manufacturing a heating tip in which an insertion cavity is formed in a tip substrate made of copper or copper alloy for insertion and containment of a heat generating portion, wherein the insertion cavity is formed by forging using a machine tool such as a header or a press.

Since the insertion cavity in the tip substrate is formed by forging, loss of material can be decreased to remarkably reduce the cost, as well as the inner wall surface of the insertion cavity can be mirror finished to suppress oxide scales, compared with the prior art of forming the cavity by cutting.

Furthermore, since forging tools suffer from less abrasion during operation compared with cutting tools, this can improve the accuracy of the insertion cavity and reduce the cost, as well as the operation can be automated easily to remarkably improve the operability.

In a preferred embodiment, the forging process preferably comprises a first step of applying diametrical drawing and centering of the tip substrate and a second step of forming the insertion cavity.

This can improve the positional accuracy for the insertion cavity remarkably to enable uniform heating for the heating tip.

In this embodiment, a corrosion resistant plating is preferably applied to the surface of the tip substrate after forming insertion cavity by forging. This enables to apply the corrosion resistant plating without lowering the positional accuracy for the insertion cavity and, since the surface of the tip substrate can be made dense by forging, stable and firm corrosion resistant plating can be attained.

The corrosion resistant plating is preferably applied with the insertion cavity being closed at the entrance.

This can eliminate the worry of damaging the inside of the insertion cavity by a plating solution even when plating is applied by using a barrel plating process of good productivity, so that there is no worry as in the prior art that the balance of the plating solution is lost by the metal (copper) leached from the cavity wall to lower the plating performance.

Preferably, the entrance of the insertion cavity is closed by machining.

This enables to apply treatment continuously on a line identical with that for forming the insertion cavity and apply the corrosion resistant plating immediately after the machining. Further, there is no worry that the balance in the composition of the plating solution is lost, different from the case of closing the entrance of the insertion cavity by using the masking material.

Preferably, machining for closing the entrance of the insertion cavity is applied by rotating the tip substrate, pressing a machining tool to the outer circumferential surface of the base end of the tip substrate and diametrically drawing the outer circumferential surface of the base end of the tip substrate toward the center.

This enables to adjust the degree of machining by the control of the pressing force of the tool or by the change of the tool, so that the insertion cavity can be closed surely irrespective of the shape, the size or the material of the tip substrate.

The machining for closing the entrance of the insertion cavity is preferably conducted by applying squeezing or pressing to the base end of the tip substrate. This can facilitate fabrication to improve the operability.

The machined portion at the base end of the tip substrate is preferably removed by cutting after applying the corrosion resistant plating.

This enables to obtain a heating tip which is identical with that in which the insertion cavity is formed by cutting after applying the corrosion resistant plating.

Electroless plating is preferably applied to at least the inner surface of the insertion cavity after cutting to remove the machined portion at the base end of the tip substrate.

In this case, a stable plating layer can be obtained easily.

A further preferred embodiment of the method of manufacturing a heating tip according to the present invention comprises forming the insertion cavity in the tip by foregoing, applying electroless plating to the surface of the tip substrate, applying cutting to the top end of the tip substrate for forming a tip shape, and then applying corrosion resistant plating to the surface of the tip substrate with the insertion cavity being closed at the entrance and, subsequently, the entrance of the insertion cavity is opened.

As the corrosion resistant plating, a heating tip having the insertion cavity formed by forging can be obtained easily.

In this embodiment, chromium plating is preferably applied to the surface of the tip substrate excepting for the top end after opening the entrance of the insertion cavity.

This enables to easily obtain a heating tip having excellent solder wettability only at the top end.

Preferably, machining is applied to the base end of the tip substrate thereby closing the entrance of the insertion cavity.

This enables to apply treatment continuously on a line identical with that for forming the insertion cavity and apply the corrosion resistant plating immediately after the machining. Further, there is no worry that the balance in the composition of the plating solution is lost, different from the case of closing the entrance of the insertion cavity by using the masking material.

The machining for closing the entrance of the insertion cavity is preferably applied by rotating the tip substrate, pressing a machining tool to the outer circumferential surface of the base end of the tip substrate and diametrically drawing the outer circumferential surface of the base end of the tip substrate toward the center.

This enables to adjust the degree of the machining by the control of the pressing force of the tool or by the change of the tool, so that the insertion cavity can be closed surely irrespective of the shape, the size or the material of the tip substrate.

The machining for closing the entrance of the insertion cavity is preferably conducted by applying squeezing or pressing to the base end of the tip substrate. This can facilitate fabrication to improve the operability.

The entrance of the insertion cavity is preferably opened by removing the base end of the tip substrate by cutting. This enables to obtain a heating tip easy to fabricate and having a required length easily.

In any of the embodiments or modifications described above, the inner wall circumferential surface of the insertion hole is formed into a non-circular shape, preferably, a normal polygonal shape within a range from a normal trigonal shape to a normal octagonal shape. This enables to increases the area of the contact remarkably with a relatively simple shape, and enhance the heat conductivity and the temperature rising property, as well as improve the thermal response of the heating tip.

BRIEF DESCRIPTION OF THE DRAWINGS

These and other objects, as well as advantageous features of the present invention will become apparent by way of the following descriptions, with reference to the accompanying drawings, wherein FIG. 1(*a*) is a cross sectional view illustrating a heating tip according to a preferred embodiment of the present invention and FIG. 1(*b*) is a right side elevational view of the tip shown in FIG. 1(*a*).

PREFERRED EMBODIMENTS OF THE INVENTION

Preferred embodiments of the present invention will be explained with reference to the drawings.

Figure 1A:
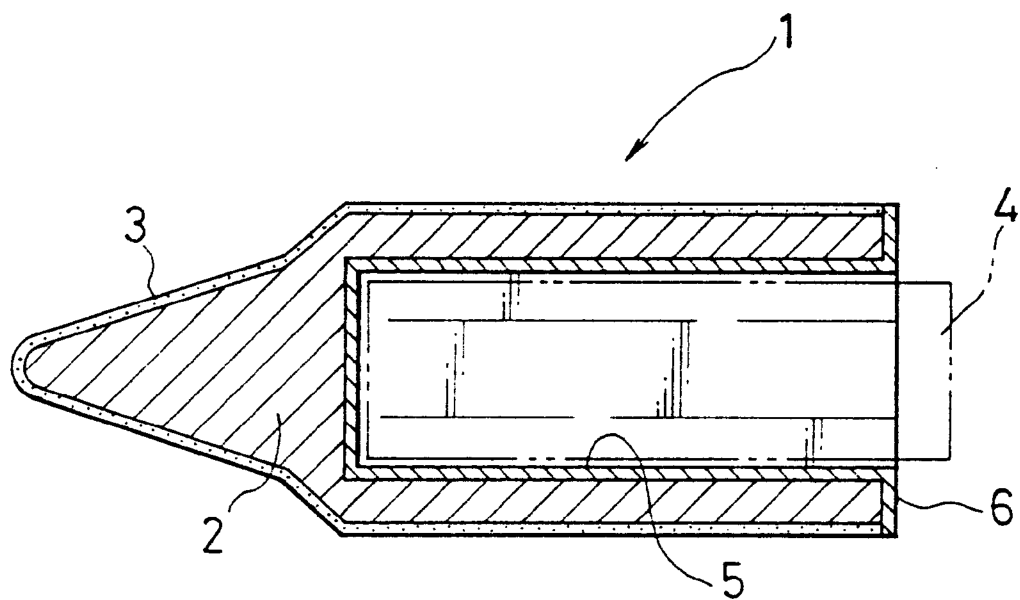
Figure 1B:
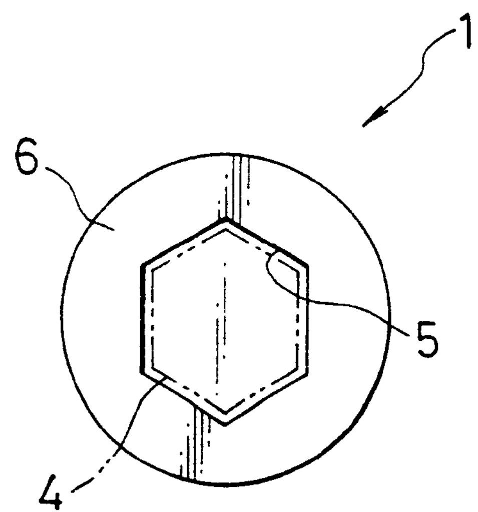
Figure 2A:
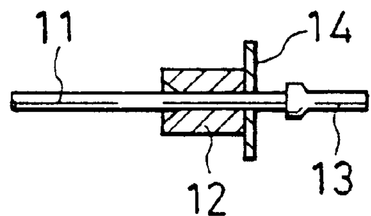
FIG. 2(*a*) through FIG. 2(*h*) are explanatory views for illustrating a method in accordance with a preferred embodiment of the present invention for forming an insertion cavity in the heating tip shown in FIG. 1 by using a header in accordance with successive procedures.
Figure 2B:
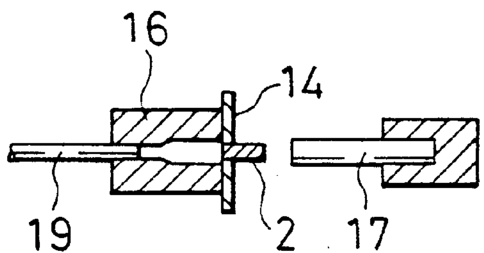
Figure 2C:
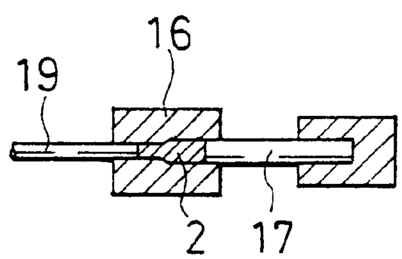
Figure 2D:
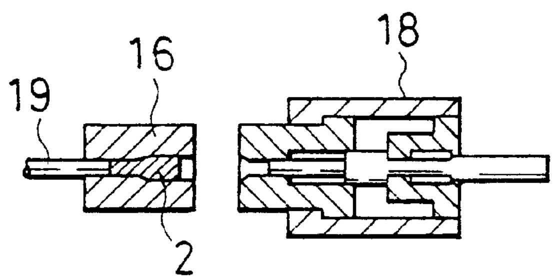
Figure 2E:
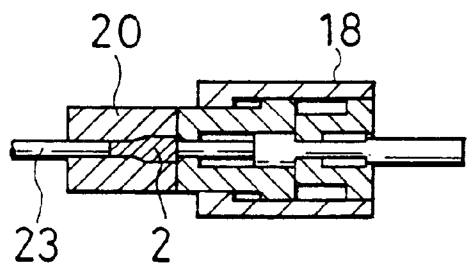
Figure 2F:
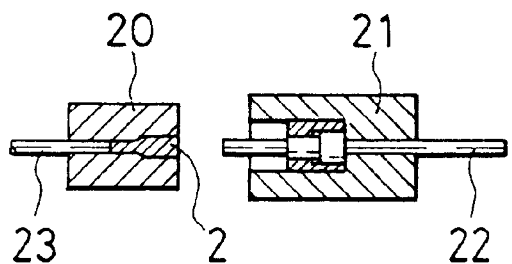
Figure 2G:
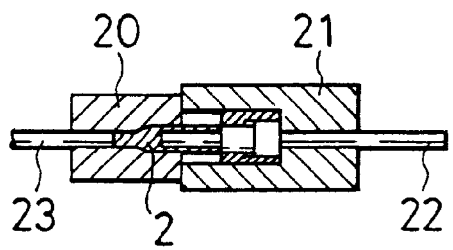
Figure 2H:
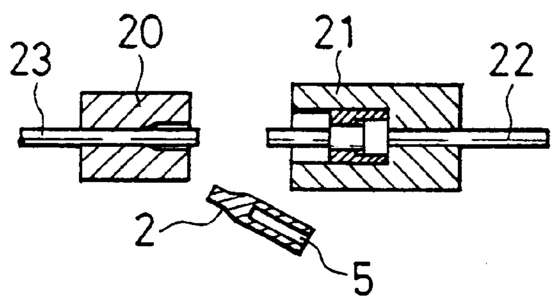

FIG. 1 shows an electrical soldering iron tip as a heating tip according to a preferred embodiment of the present invention, in which soldering tip 1 has a cylindrical tip substrate 2 made of copper or copper alloy, and a corrosion resistant iron plated layer 3 is formed by electrolytic plating on the outer surface thereof.

As shown in FIG. 1(*a*), (*b*), an insertion cavity 5 for inserting and containing an electric heater 4 that constitutes a heat generating portion is provided in the base end of the tip substrate 2, and the insertion cavity 5 is formed in a non-circular cross sectional shape, for example, a normal hexagonal shape identical with a cross sectional shape on the outer surface of the electric heater 4. Then, a nickel plating layer 6 is formed to the inner wall surface of the insertion cavity 5 and at the base end face of the tip substrate 2.

Then, a preferred embodiment a the method of manufacturing the soldering tip 1 is to be explained.

At first, as shown in FIG. 2(*a*), a cylindrical material 11 made of copper or copper alloy is fed through a cutter die 12, and the top end thereof is abutted against a stopper 13 to determine a length to be cut. Subsequently, the cylindrical material 11 is gripped by a cutter 14, the cutter 14 is moved in this state and the material 11 is cut between the cutter 14 and the cutter die 12 to obtain a tip substrate 2 of a predetermined length. The tip substrate 2 is transferred to a first die 16 by the movement of the cutter 14 as shown in FIG. 2(*b*).

Then, as shown in FIG. 2(*c*), a first puncher 17 is advanced and the tip substrate 2 is shaped by drawing by means of the first die 16 and the first puncher 17.

Then, as shown in FIG. 2(*d*), a second puncher 18 is moved to a position for the first die 16, the tip substrate 2 is extruded out of the first puncher 17 by a first die knock out pin 19, and the extruded tip substrate 2 is gripped by a second puncher 18. Then, the gripped tip substrate 2 is transferred to a position for a second die 20 by the movement of the second puncher 18. Then, as shown in FIG. 2(*e*), centering alignment is conducted for the tip substrate 2 by the second puncher 18 and the second die 20.

Then, as shown in FIG. 2(*f*), a third puncher 21 is moved to a position for the second die 20, the third puncher 21 is further advanced and, as shown in FIG. 2(*g*), an insertion cavity is formed by the second die 20 and the third puncher 21.

Then, as shown in FIG. 2(*h*), the third puncher 21 is retracted, a second puncher knock out pin 22 is protruded and the tip substrate 2 is firmly held in the second die 20. Immediately, a second die knock out pin 23 is protruded to extrude the tip substrate 2 out of the second die 20.

Figure 3A:
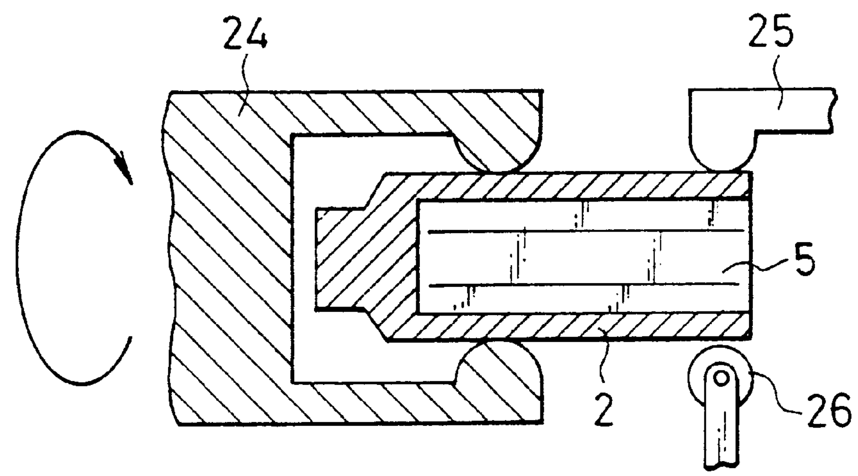
FIG. 3(*a*) through FIG. 3(*c*) are explanatory views for illustrating a method of closing an entrance of an insertion cavity and then applying a corrosion resistant plating in accordance with successive procedures.
Figure 3B:
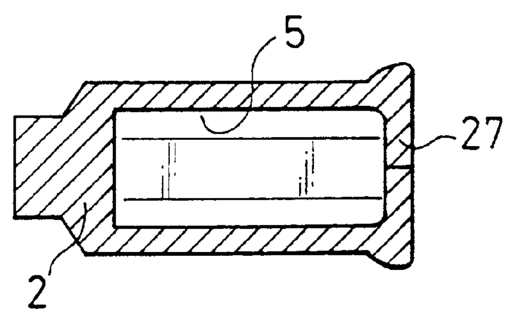
Figure 3C:
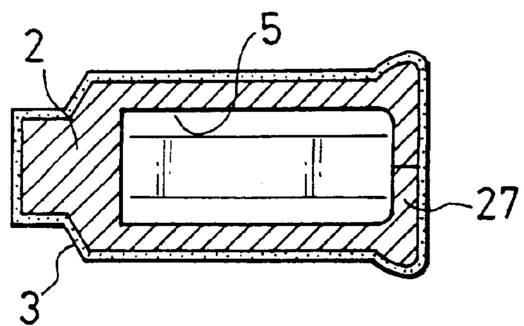

Then, as shown in FIG. 3(*a*), the tip substrate 2 having the insertion cavity 5 is gripped and rotated at the top end thereof by a chuck 24 and a pressing tool such as a knife 25 or a roller 26 having hard chromium plating formed on the surface is pressed against the outer circumferential surface at the base end of the tip substrate 2. A machined portion 27 is formed by this machining operation at the base end of the chip substrate 2 and an entrance of the insertion cavity 5 opened at the base end of the substrate 2 is completely closed with the machined portion 27 as shown in FIG. 3(*b*). Then, the tip substrate 2 is electrolytically plated by using a barrel (not illustrated) and, as shown in FIG. 3(*c*), an iron plating layer 3 is formed on the surface thereof.

Figure 4A:
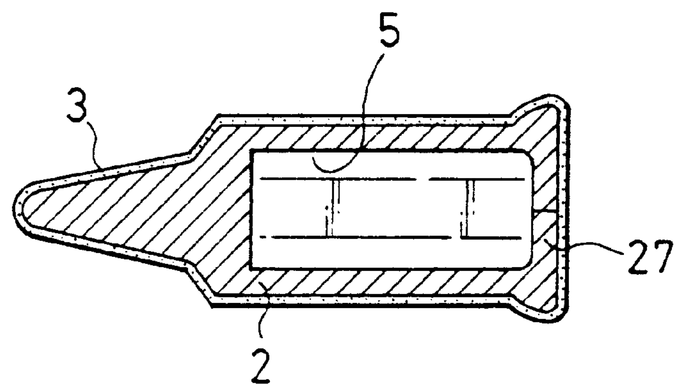
FIG. 4(*a*) through FIG. 4(*c*) are explanatory views for illustrating a method of applying electroless plating in the inside of the insertion cavity in accordance with successive procedures.
Figure 4B:
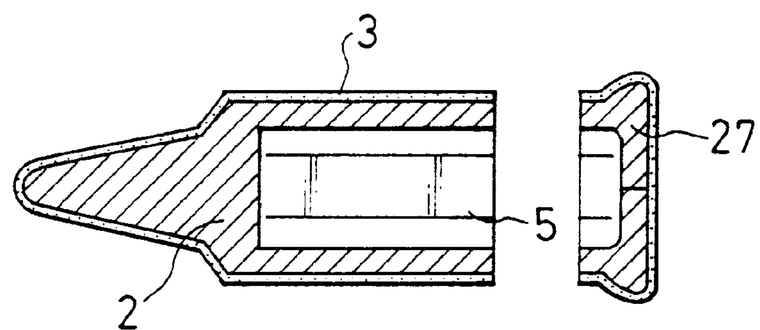
Figure 4C:
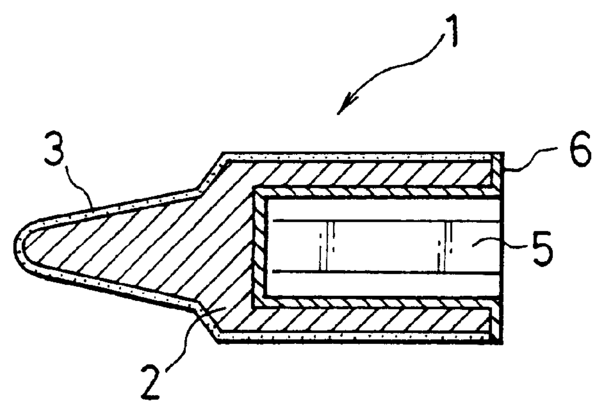
Figure 5A:
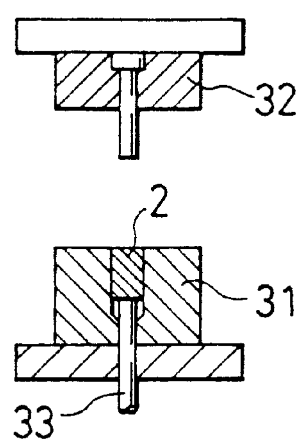
FIG. 5(*a*) through FIG. 5(*c*) are explanatory view for illustrating a method in accordance with another preferred embodiment of the present invention for forming an insertion cavity of the heating tip shown in FIG. 1 by using a press in accordance with successive procedures.
Figure 5B:
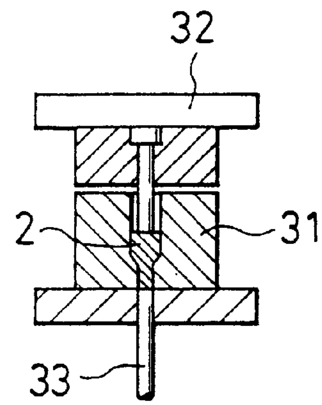
Figure 5C:
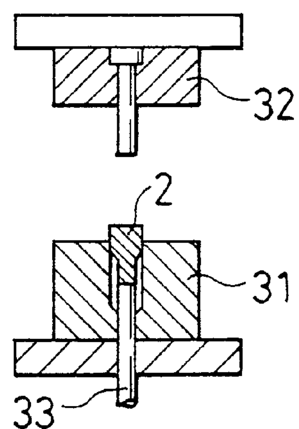
Figure 5D:
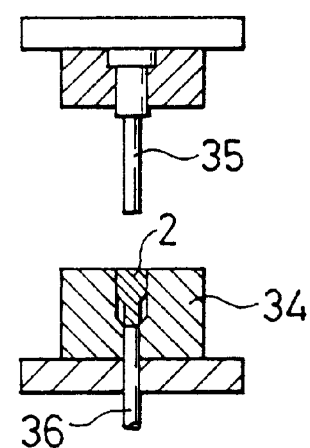
Figure 5E:
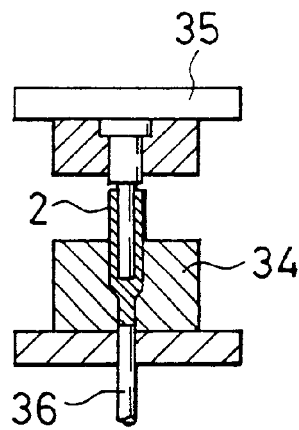
Figure 5F:
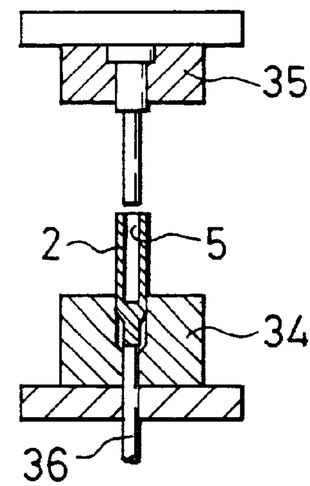

Then, the tip substrate 2 having the iron plated layer 3 is formed into a shape of a desired soldering tip as shown in FIG. 4(*a*) by swaging or the like, for example, as disclosed in U.S. Pat. No. 4,500,027. Subsequently, as shown in FIG. 4(*b*), the machined portion 27 at the base end portion of the tip substrate 2 is removed by cutting.

Then, as shown in FIG. 4(*c*), a nickel plating layer 6 is formed by an electroless process to the inner surface of the insertion cavity 5 and the base end surface of the tip substrate 2 to complete a soldering tip 1.

In this embodiment, the insertion cavity 5 is formed by forging in the header and a portion of the material, which is driven out by forging from the space to form the insertion cavity 5 is transformed and elongated axially and can form as it is a portion of the top end of the soldering tip 1. Therefore, the amount of the material can be saved by about 50% or more, as compared with the prior art of forming the insertion cavity 5 by cutting or scraping the inside of the substrate 2, in which the cut material was merely discarded as chipping wastes. This can also reduce the burden on waste discarding operation.

Further, in the prior art of forming the insertion cavity 5 by drilling, since the drilling tool was abraded remarkably, even if a super-hard drill is used, insertion cavities 5 can be fabricated in only up to about 1000 pieces of tips by one drill. On the other hand, since there is less abrasion of the tool in the case of forging using the header, insertion cavities can be fabricated in about 15000 pieces of tips by using only one puncher 21 (refer to FIG. 2) in this embodiment. Furthermore, the dimensional accuracy for the insertion cavity 5 formed can be improved greatly.

Further, since the inner wall of the insertion cavity 5 has a non-circular cross sectional shape corresponding to the cross sectional shape on the outer circumferential surface of the electric heater 4, the area of contact with the electric heater 4 can be enlarged as shown in Table 1.

TABLE 1

| Cross sectional shape of insertion hole | Normal trigonal shape | Normal square shape | Normal pentagonal shape | Normal hexagonal shape | Normal octagonal shape | Circular shape |
|---|---|---|---|---|---|---|
| Ratio of circumferential surface to circular shape (as 100) | 129 | 113 | 108 | 105 | 103 | 100 |

Table 1 compares the inner wall circumferential surface area of the insertion cavity 5 between each polygonal shape and a circular shape while assuming the volume of the insertion cavity 5 is identical. It can be seen from Table 1 that the area of contact of the inner wall circumferential surface of the insertion cavity 5 with the outer circumferential surface of the electric heater 4 can be increased if the cross sectional shape of the insertion cavity 5 is made as a non-circular shape, preferably, a polygonal shape, compared with the case of a circular cross sectional shape. That is, the amount of heat generated from the tip 1 can be increased by so much as the area of contact is increased, which increases the heat capacity even if the heat transmission amount per unit area is identical.

Figure 6A:
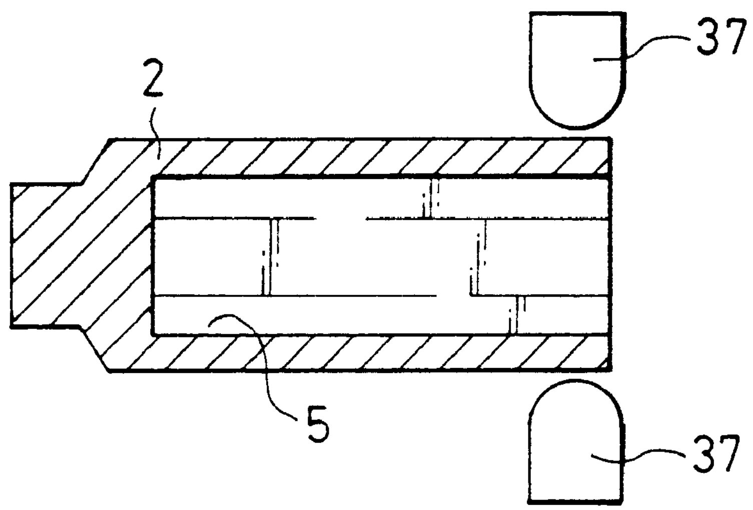
FIG. 6(*a*) and FIG. 6(*b*) are explanatory views illustrating a method of closing the entrance of the insertion cavity by pressing or squeezing.
Figure 6B:
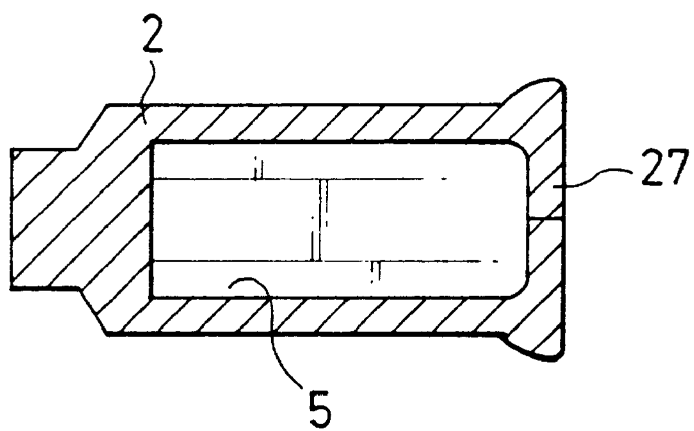

FIG. 5 and FIG. 6 show another preferred embodiment of a method for manufacturing a heating tip according to the present invention in which an insertion cavity 5 is formed by using a press, and a machined portion 27 is formed by pressing or squeezing.

Namely, in the manufacturing method according to this preferred embodiment, a tip substrate 2 cut into a predetermined size is at first set to a first die plate 31 as shown in FIG. 5(*a*), a first puncher 32 is lowered to apply drawing and centering fabrication to the tip substrate 2 as shown in FIG. 5(*b*). Subsequently, as shown in FIG. 5(*c*), a first knock out pin 33 is elevated to extrude the tip substrate 2 out of the first die plate 31.

Then, as shown in FIG. 5(*d*), the tip substrate 2 is set to a second die plate 34 and, as shown in FIG. 5(*e*), a second puncher 35 is lowered to form an insertion cavity 5 in the tip substrate 2. Subsequently, a second knock-out pin 36 is elevated to extrude the tip substrate 2 out of the second die plate 34.

Then, as shown in FIG. 6(*a*), the base end of the tip substrate 2 having the insertion cavity 5 is fabricated by an appropriate machine 37 for conducting pressing or squeezing to form a machined portion 27 that closes the entrance of the insertion cavity 5 as shown in FIG. 6(*b*).

Subsequently, the tip substrate 2 is fabricated by using the same method and procedures as those in the previous embodiment to obtain a soldering tip 1 like that in the previous embodiment.

Also in this embodiment, the same effects as those of the pervious embodiment can be obtained.

Figure 7A:
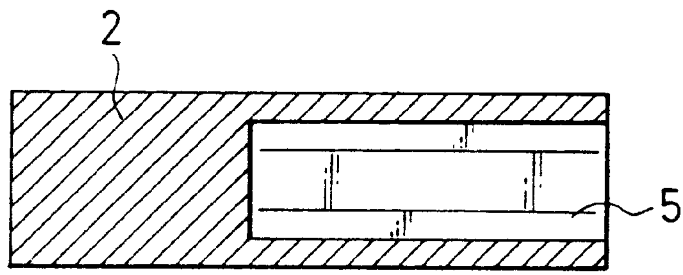
FIG. 7(*a*) through FIG. 7(*c*) are explanatory views illustrating a method of manufacturing a heating tip according to a further preferred embodiment of the present invention in accordance with successive procedures.
Figure 7B:
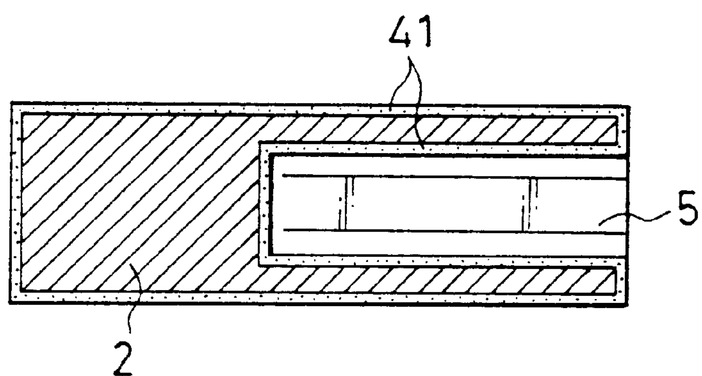
Figure 7C:
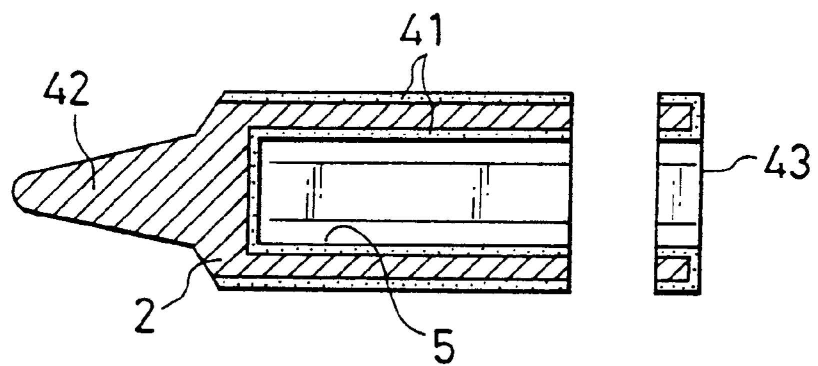
Figure 8A:
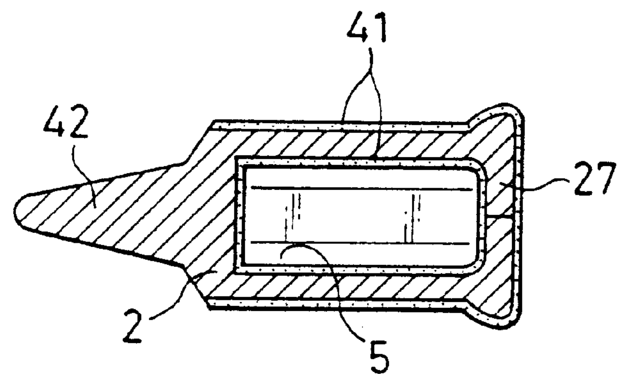
FIG. 8(*a*) through FIG. 8(*c*) are explanatory views illustrating successive procedures conducted subsequent to FIG. 7.
Figure 8B:
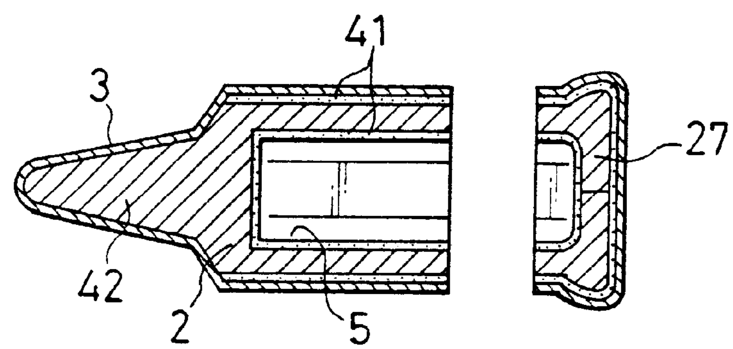
Figure 8C:
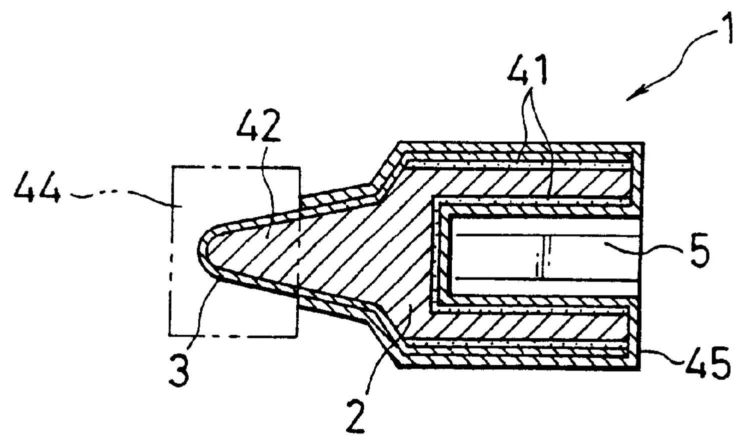

FIG. 7(*a*) through FIG. 7(*c*) and FIG. 8(*a*) through FIG. 8(*c*) show a further preferred embodiment of a method for manufacturing a heating tip according to the present invention in which a soldering tip 1 is manufactured by a method different from that in the previous embodiment.

That is, in this embodiment, as shown in FIG. 7(*a*), a tip substrate 2 having an insertion cavity 5 is manufactured by the same method as that in the previous embodiment. Subsequently, an electroless nickel plating layer 41 is formed on the surface of the tip substrate 2 as shown in FIG. 7(*b*).

Then, as shown in FIG. 7(*c*), the top end of the tip substrate 2 having the nickel plating layer 41 is machined by cutting to form a soldering tip 42 and a base end 43 of the tip substrate 2 is removed by cutting.

Then, as shown in FIG. 8(*a*), machining is applied by the same method as that in the previous embodiment to form a machined portion 27 at the base end of the tip substrate 2. Then, the entrance of the insertion cavity 5 is completely closed by the machined portion 27.

Then, the tip substrate 2 is electrolytically plated by using a barrel device (not illustrated) to form an iron plating layer 3 on the surface, and the machined portion 27 at the base end of the tip substrate 2 having the iron plated layer 3 is removed by cutting as shown in FIG. 8(*b*).

Then, as shown in FIG. 8(*c*), a chromium plating layer 45 is formed electrolytically on the surface of the tip substrate 2 in a state where the top end 42 of the tip is covered with a masking material 44 to complete a soldering tip 1.

Also in this embodiment, since the insertion cavity 5 is formed by forging, the amount of the material can be saved and the dimensional accuracy for the insertion cavity 5 can be improved remarkably.

Further, since the top end 42 of the tip is formed by cutting the top of the tip substrate 2, the top end 42 can be fabricated easily into any desired shape. Further, since the chromium plating layer 45 is formed on the surface of the tip substrate 2 excepting for the top end, a heating tip excellent in the solder wettability only at the top end can be obtained easily.

In each of the embodiments described above, explanation has been made to a case of manufacturing the soldering tip 1 by using the electric heater 4 as the heating tip. However, the present invention is applicable also to a soldering tip, a hot knife or a hot blow tip that uses a gas combustion catalyst as a heat generating portion for a heating tip, to provide advantageous effects similar with those described above.

What is claimed is:

1. A heating tip in which an insertion cavity is formed in a tip substrate made of one of copper and copper alloy for insertion and containment of a heat generating portion, said cavity extending in a longitudinal direction, wherein the inner wall circumferential surface of the insertion cavity circumscribing said longitudinal direction is formed into a non-circular diametrical cross sectional shape which is identical with a non-circular diametrical cross sectional shape on the outer circumferential surface of the heat generating portion circumscribing said longitudinal direction.

2. A heating tip as defined in claim 1, wherein the non-circular diametrical cross sectional shape of the insertion cavity is a polygonal shape in a range from a normal trigonal shape to a normal octagonal shape.

* * * * *